United States Patent [19]

Leaphart et al.

[11] Patent Number: 5,696,677
[45] Date of Patent: Dec. 9, 1997

[54] VEHICLE CHASSIS CONTROL

[75] Inventors: Eldon Gerrald Leaphart, Southfield; Edward John Bedner, Ann Arbor, both of Mich.; Richard Charles Swortzel; Albert Victor Fratini, Jr., both of Kettering, Ohio; Kamal Naif Majeed, Centerville, Ohio

[73] Assignee: General Motors Corporation, Detroit, Mich.

[21] Appl. No.: 547,084

[22] Filed: Oct. 23, 1995

Related U.S. Application Data

[63] Continuation-in-part of Ser. No. 410,788, Mar. 27, 1995, Pat. No. 5,570,288.

[51] Int. Cl.$^6$ .................................................. B60K 41/00
[52] U.S. Cl. .............................................. 364/424.046
[58] Field of Search ...................... 364/424.05, 424.046, 364/424.047; 180/142; 303/175; 280/707

[56] References Cited

U.S. PATENT DOCUMENTS

| | | | |
|---|---|---|---|
| 4,352,509 | 10/1982 | Paton et al. | 280/716 |
| 4,809,179 | 2/1989 | Klinger et al. | 364/424.05 |
| 4,835,695 | 5/1989 | Walenty et al. | 364/426.02 |
| 4,905,783 | 3/1990 | Bober | 180/142 |
| 4,917,445 | 4/1990 | Leppek et al. | 303/100 |
| 4,969,662 | 11/1990 | Stuart | 280/707 |
| 5,096,219 | 3/1992 | Hanson et al. | 280/707 |
| 5,097,916 | 3/1992 | Brandstadter | 180/9.1 |
| 5,123,497 | 6/1992 | Yopp et al. | 180/142 |
| 5,217,246 | 6/1993 | Williams et al. | 280/707 |
| 5,444,621 | 8/1995 | Matsunaga et al. | 364/424.05 |
| 5,454,630 | 10/1995 | Zhang | 303/175 |
| 5,510,986 | 4/1996 | Williams | 364/424.05 |

OTHER PUBLICATIONS

USSN 08/358,925, Assigned to the Assignee of this invention.
USSN 08/441,369, Assigned to the Assignee of this invention.
USSN 08/410,788, Assigned to the Assignee of this invention.

*Primary Examiner*—Kevin J. Teska
*Assistant Examiner*—Stephen J. Walder, Jr.
*Attorney, Agent, or Firm*—Anthony Luke Simon

[57] ABSTRACT

A vehicle chassis system control according to the steps of: determining relative velocity between a corner of a vehicle body and a vehicle wheel responsive to a sensor signal from one of: (i) a relative position sensor mounted between the vehicle body corner and the vehicle wheel and (ii) a wheel rotational velocity sensor mounted to the wheel; estimating, responsive to the sensor signal, a body acceleration signal indicative of a vertical acceleration of the corner of the vehicle body; estimating, responsive to the sensor signal, a wheel acceleration signal indicative of a vertical acceleration of the vehicle wheel; estimating a dynamic normal force between the wheel and a road surface responsive to the estimated body and wheel accelerations; and providing the estimated normal dynamic force to a chassis system controller, wherein a chassis system actuator is controlled by a control command determined responsive to the estimated dynamic normal force.

16 Claims, 13 Drawing Sheets

5,696,677

VEHICLE CHASSIS CONTROL

This application is a continuation-in-part of U.S. Pat. No. 5,570,288 application Ser. No. 08/410,788, filed Mar. 27, 1995, assigned to the assignee of this invention and the disclosure of which is incorporated herein by reference. This subject of this application is related to the subject of pending U.S. patent application Ser. No. 08/441,369 filed May 15, 1995 assigned to the assignees of this invention and having a disclosure incorporated herein by reference.

This invention relates to a vehicle chassis control.

BACKGROUND OF THE INVENTION

Dynamic normal force is defined as the change in force between a vehicle wheel and a road surface in the direction perpendicular or normal to the road surface. In certain chassis control systems, for example, anti-lock brake systems, there may be an advantage provided by a control function responsive to dynamic normal forces between each of the vehicle wheels and the road surface. However, the typical automotive vehicle contains no sensors or other device for directly measuring dynamic normal force between the wheels and the road surface.

Pending U.S. patent application Ser. No. 08/235,733, filed Apr. 29, 1994, assigned to the assignee of this invention and having a disclosure incorporated herein by reference, discloses a method and apparatus for determining dynamic normal forces between vehicle wheels and the road surface and using the determined dynamic normal forces in an anti-lock brake system control. The apparatus described in pending application Ser. No. 08/235,733 requires body accelerometers at each corner of the body to measure body acceleration and uses the resultant body acceleration measurements, along with other parameters, to determine the dynamic normal forces between the wheels of the vehicle and the road surface.

SUMMARY OF THE PRESENT INVENTION

Advantageously, this invention provides a vehicle chassis system control in accordance with claim 1.

In an advantage provided by this invention, a vehicle chassis system control includes determination of estimated dynamic normal forces between vehicle wheels and the road surface. In a further advantage of this invention, dynamic normal forces are estimated without requiring signals provided by body corner accelerometers or any other body accelerometer, thus allowing control of a chassis system based on dynamic normal force estimations while eliminating a plurality of body sensors. A further advantage provided by this invention is a cost savings based on elimination of the body acceleration sensors.

In accordance with an example implementation of this invention, a vehicle chassis system control is provided according to the steps of: determining relative velocity between a corner of a vehicle body and a vehicle wheel responsive to a sensor signal from one of: (i) a relative position sensor mounted between the vehicle body corner and the vehicle wheel and (ii) a wheel rotational velocity sensor mounted to the wheel; estimating, responsive to the sensor signal, a body acceleration signal indicative of a vertical acceleration of the corner of the vehicle body; estimating, responsive to the sensor signal, a wheel acceleration signal indicative of a vertical acceleration of the vehicle wheel; estimating a dynamic normal force between the wheel and a road surface responsive to the estimated body and wheel accelerations; and providing the estimated normal dynamic force to a chassis system controller, wherein a chassis system actuator is controlled responsive to the estimated dynamic normal force.

BRIEF DESCRIPTION OF THE DRAWINGS

The present invention will now be described by way of example with reference to the accompanying drawings in which.

DETAILED DESCRIPTION OF THE INVENTION

Figure 1:
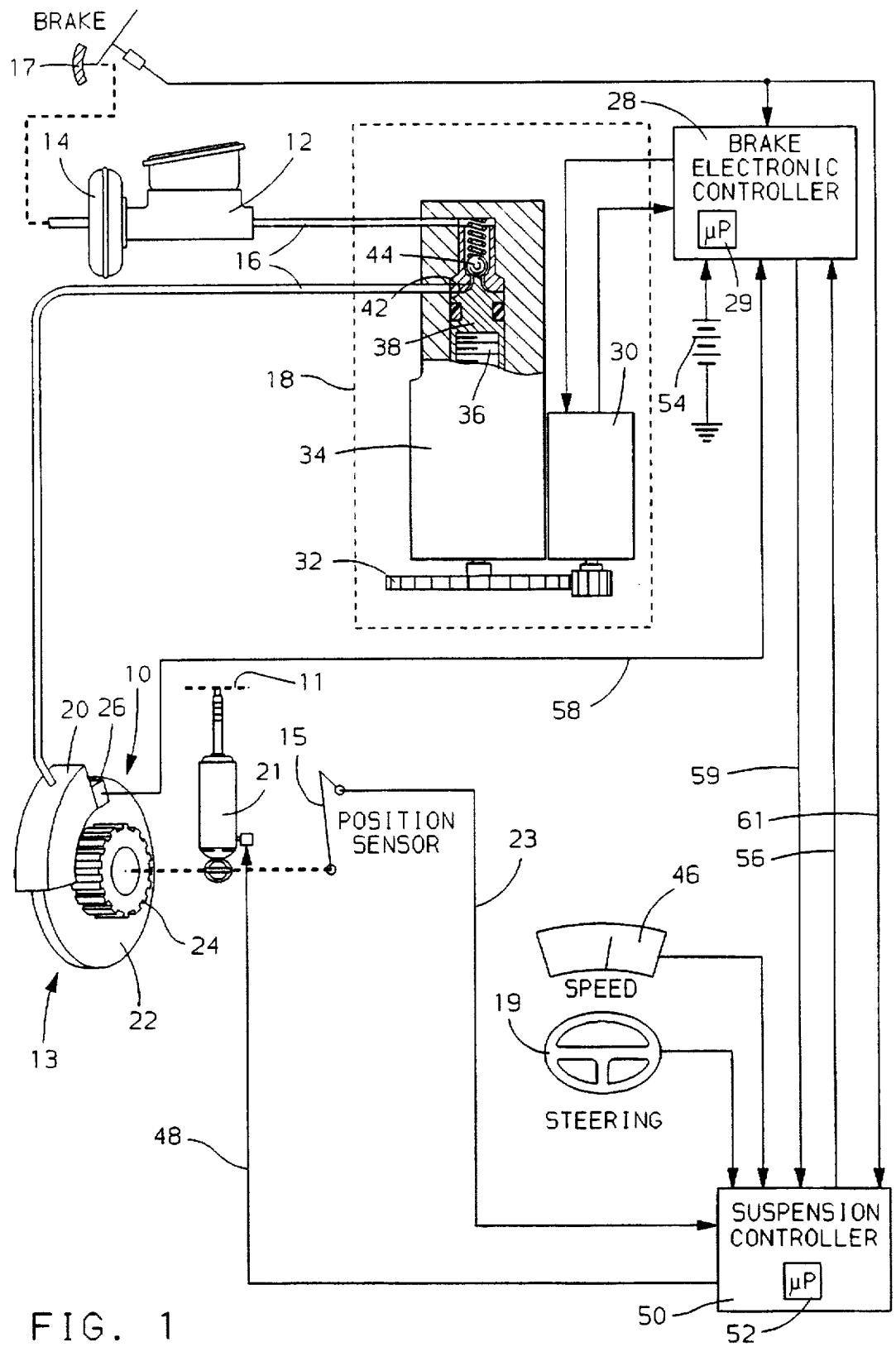
FIG. 1 illustrates an example schematic chassis system control structure according to this invention.

An chassis control system taking advantage of this invention to eliminate body accelerometers is shown in FIG. 1. The example shown illustrates this invention for use in a vehicle anti-lock braking system (that may or may not provide traction control) and in a variable force suspension system. It will be understood that this invention may be used to control a single chassis system or a plurality of chassis systems.

The wheel lock control system (anti-lock brake system) shown includes, in general, brake unit 10 operated by hydraulic pressure provided by a master cylinder 12 and a hydraulic boost unit 14 operated by the vehicle operator. The hydraulic fluid under pressure from the master cylinder 12 is provided to the brake unit 10 via brake line 16 and a pressure modulator 18. The brake unit 10 is illustrated as a disc brake system that includes a caliper 20 located at a rotor 22. The wheel includes a wheel sensing assembly comprised of an exciter ring 24 that rotates with the wheel and an electromagnetic sensor 26 that monitors the rotation of the exciter ring to provide a signal having a frequency proportional to the rotational speed of the wheel. The wheel rotational speed signal from the sensor 26 is provided to an electronic controller 28 that includes a microprocessor 29. The pressure modulator 18 is controlled by the electronic controller 28 in a known manner to limit the brake pressure applied to the wheel brake assembly 10 to prevent wheel lock-up. The modulator 18 is illustrated in an inactive position when it is transparent to the braking system. This is the modulator home position during normal vehicle braking.

In general, when the control senses a braking condition where at the wheel is approaching an incipient wheel lock-up, the pressure modulator 18 is controlled to regulate the braking pressure to the wheel to maintain the braking of the wheel in a stable braking region. The pressure modulator example shown includes a DC torque motor 30 having an output shaft that drives a gear train 32 that, in turn, rotates a linear ball screw actuator 34. The ball screw actuator contains a linearly stationary ball screw that, when rotated, linearly positions a nut 36. The nut 36 terminates in a piston 38. As the linear ball screw rotates, the piston 38 is either extended or retracted depended on the direction of rotation of the torque motor 30. Modulator 18 includes a housing in which a cylinder 42 is formed. The piston 38 is reciprocally received within the cylinder 42. The cylinder 42 forms a portion of the fluid path between the master cylinder 12 and the wheel brake 10. Included within this fluid path is a normally closed ball check-valve 44 that, when closed, isolates the master cylinder 12 from the wheel brake unit 10. The ball check valve 44 is operated to an open position by the piston 38 when it is positioned in an extended (home) position within the cylinder 42. When the ball screw check valve is open, fluid communication is provided between the master cylinder 12 and the wheel brake unit 10. This position is the normal inactive position of the pressure modulator 18 so that normal braking of the wheel of the vehicle is provided upon actuation of the brakes by the vehicle operator.

However, when torque motor 30 is operated by the electronic controller 28 to modulate the braking pressure in the wheel brake unit 10, the piston 32 is retracted, allowing the ball check valve to seek and isolate the master cylinder 12 from the wheel brake unit 10 as long as the pressure in the cylinder 42 is less than the pressure from the master cylinder 12. Further retraction of the piston 38 functions to increase the volume of the cylinder 42 thereby decreasing the pressure applied to the wheel brake unit 10. By controlling the DC torque motor 30 in a known manner, a pressure at the wheel brake can therefore be modulated to control values less than the master cylinder 12 pressure output until such time that the piston 38 again unseats the ball check valve 44 or until the pressure generated by the pressure modulator at the wheel brake 10 exceeds the fluid pressure output of the master cylinder 12. When this latter condition exists, the ball check valve 44 is opened by the differential fluid pressure, which limits the pressure of the wheel brake unit 10 at the master cylinder 12 pressure. In this manner, the wheel cylinder pressure can never exceed the operator's established pressure.

The vehicle body 11 is supported by four wheels 13 (only one shown) and by four suspensions including springs of a known type (not shown). Each suspension includes a variable-force real time controllable damper 21 (only one shown) connected to exert a vertical force between wheel 13 and body 11 at that suspension point. Although many such suspension arrangements are known and appropriate to this invention, actuator 21 of this example preferably comprises an electrically controllable variable force damper in parallel with a weight bearing coil spring in a parallel shock absorber/spring or McPherson strut arrangement. A description of an example variable force damper suitable for use as actuator 12 is the continuously variable damper described in U.S. Pat. No. 5,282,645, assigned to the assignee of this invention.

Four linear relative positions sensors 15 (only one shown) are mounted between the four corners of the body and the four wheels 13. Each relative position sensor 15 provides an output signal indicative of the relative vertical distance between the vehicle wheel and the suspended vehicle body at that corner of the vehicle. Relative position sensors 15 may be of the type having a link coupled to the vehicle wheel and pivotally connected to a pivot arm on a rotary resistive device that provides an impedance output that varies with the relative position between wheel 13 and the corner of body 10. Each relative position sensor 15 may include an internal circuit board with a buffer circuit for buffering the output signal of the rotary resistive device. Any alternative type of position sensor, including transformer type sensors, may also be used.

The outputs of relative position sensors 15 are processed in the suspension controller 50, including microprocessor 52, which determines the corner body to wheel relative velocities and states of vehicle body 11 (and wheels 13) and generates an output actuator control signal on line 48 for each variable force actuator 21. These signals are applied from controller 50 through suitable output apparatus to control actuators 21 in real time. Input signals for the determination of the output actuator control signals may also be provided to controller 50 by vehicle brake apparatus 17 (or power train controller) to provide anticipation of vehicle pitch (lift/drive) or by a vehicle speed sensor 46 and a steering wheel angular position sensor 19 to provide anticipation of vehicle roll. Obtaining such signals is easily achieved through the use of known types of sensors available to those skilled in the art.

The suspension controller 50 provides, via bus 56 to the brake electronic controller 28, signals representative of the state of operation of the vehicle suspension system including computed dynamic normal force between each wheel and road surface determined according to this invention. Alternatively, signals from which dynamic normal force may be computed, such as signals representative of states including suspension relative velocity, body absolute velocity, and/or wheel absolute velocity signals, are sent to the brake controller where the dynamic normal force between each wheel and the road surface is determined according to this invention.

It is noted that the improvements of pending application, Ser. No. 08/441,369, may be used to develop the body to wheel relative velocity signals and the body modal velocity signals. In implementing the invention of application, Ser. No. 08/441,369, with this invention, the relative velocity and body modal velocity signals, once obtained, are used as described below.

With the exception of the improvements set forth herein and in the pending applications referred to herein, the control functions of the brake controller 28 and suspension controller 50, including the general brake and suspension control functions, are of a type well known to those skilled in the art and further detail of the brake controller 28, suspension controller 50 and the controls implemented therein need not be set further in detail herein.

EXAMPLE 1

Figure 2:
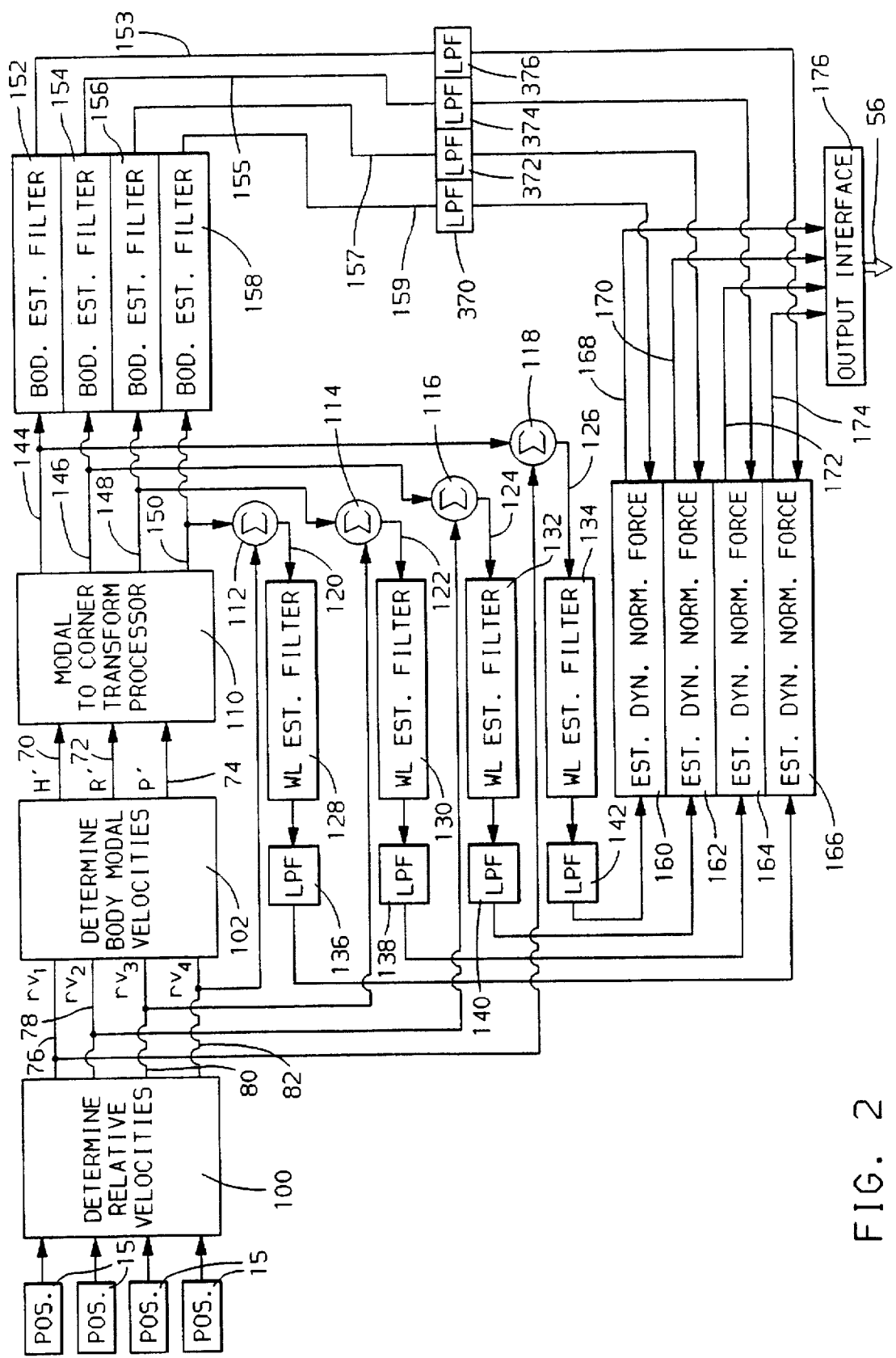
FIG. 2 illustrates an example schematic of the operation of this invention to estimate dynamic normal forces.

Referring now to FIG. 2, example control according to this invention for estimating the dynamic normal forces between the vehicle wheels and the road surface begins with the relative position sensors 15 providing signals indicative of the distance (relative position) between the body corners 10 and wheels 13. The relative position signals are provided to block 100 where they are low pass filtered through four low pass filters and differentiated through four analog differentiators to provide four relative velocity signals. An exemplary combination of such low pass filter and differentiators is shown in U.S. Pat. No. 5,255,191, issued Oct. 19, 1993.

The resultant relative velocity signals represent the relative velocity between the front left wheel and the front left corner of the body ($rv_1$), the rear left wheel and the rear left corner of the body ($rv_2$), the front right wheel and the front right corner of the body ($rv_3$) and the rear right wheel and the rear right corner of the body ($rv_4$). Each of these relative velocity signals is input to a digital microcomputer 52 that includes an input A/D converter (not shown) with multiplexed inputs. Each input signal is high pass filtered by a digitally implemented high pass filter of a known type to remove any DC offset introduced by the digitization of the A/D converter.

The resulting filtered relative velocity signals are provided on lines 76, 78, 80 and 82 to a control algorithm processor of a known type, or of the type set forth in the copending applications mentioned herein. The control algorithm processor uses the relative velocity signals as input variables upon which output control signals for the vehicle suspension system are determined. The signals on line 76, 78, 80 and 82 are also provided to block 102, which converts the relative velocity signals to body modal velocity signals representing absolute body heave velocity on line 62, body absolute pitch velocity on line 64 and body absolute roll velocity on line 66.

At block 102, the conversion of these relative velocity signals to the body modal velocity signals on lines 62, 64 and 66 is done in the manner described in pending patent application U.S. Ser. No. 08/358,925, filed Dec. 19, 1994, assigned to the assignee of this invention. In general, block 102 comprises the step of geometrically transforming the relative velocity signals on lines 76, 78, 80 and 82 to signals indicating the relative heave, roll and pitch velocities between the vehicle body and wheels. Block 102 then low pass filters the relative heave, roll and pitch velocity signals to obtain the body components thereof, which are typically in the 1 Hz range, to provide the signals representing body absolute heave velocity (H'), body absolute roll velocity (R') and body absolute pitch velocity (P') on lines 70, 72 and 74.

A more complete description of this process is set forth in the above-mentioned pending application Ser. No. 08/358,925 and need not be repeated herein.

The body heave, roll and pitch velocity signals on lines 70, 72 and 74 may also be used as inputs for a suspension system control algorithm in a known manner or in the manner described in any of the pending applications mentioned herein that detail such control.

To determine the dynamic normal force estimates according to this invention, the signals on lines 70, 72 and 74 are provided to geometric transform block 110. Geometric transform block 110 performs a modal-to-corner transform of the signals on lines 70, 72 and 74, transforming the body modal heave, roll and pitch velocity signals, H', R', and P', into signals on lines 144, 146, 148 and 150 representing the vertical velocities of the four corners of the vehicle body.

More particularly, the modal-to-corner transform used to obtain the body corner absolute vertical velocities is expressed in matrix form as:

$$\begin{bmatrix} v_{blf} \\ v_{brf} \\ v_{blr} \\ v_{brr} \end{bmatrix} = \begin{bmatrix} 1 & -ftw/2 & -wb/1 \\ 1 & ftw/2 & -wb/2 \\ 1 & -rtw/2 & wb/2 \\ 1 & rtw/2 & wb/2 \end{bmatrix} * \begin{bmatrix} H' \\ R' \\ P' \end{bmatrix}$$

where $v_{brf}$ is the right front body corner vertical absolute velocity, $v_{blf}$ is the left front body corner vertical absolute velocity, $v_{blr}$ is the left rear body corner vertical absolute velocity, $v_{brr}$ is the right rear body corner vertical absolute velocity, ftw is the front track width of the vehicle (average distance between the two front tires), rtw is the rear track width of the vehicle (average distance between the two rear tires), wb is the wheel base of the vehicle (distance between front and rear wheels), H' is the body absolute heave velocity on line 70, R' is the body absolute roll velocity on line 72, and P' is the body absolute pitch velocity on line 74.

Blocks 152, 154, 156 and 158 represent body estimation filters used to convert the corner absolute vertical velocities on lines 144, 146, 148 and 150 to corner absolute vertical accelerations. The absolute velocity to acceleration conversion is implemented as a fixed gain Kalman filter with a velocity to acceleration transfer function given as:

$$\frac{a(k)}{y(k)} = \frac{K_a(z-1)}{z^2 + (K_v + K_a T_s - 2)z + (1 - K_v)}$$

where a(k) is the estimated corner absolute vertical acceleration, y(k) is the corner vertical velocity determined at block 110, $T_s$ is the sampling time, for example, 1 millisecond, and $K_v$ and $K_a$ are the gains for the Kalman filter transfer function that are selected to anticipate the body frequencies in the range of 0–2 Hz. The gains, once selected, can be further tuned experimentally to obtain the desired frequency response. (For a detailed description of a discrete Kalman filter scheme, see B. D. O. Anderson and J. B. Moore, *Optimal Filtering*, Prentice Hall, 1979).

The above transfer function is implemented in a control algorithm as two coupled discrete equations that solve for the Kalman velocity and acceleration estimates. The velocity estimate is implemented as:

$$v(k) = v_1 v(k-1) + v_2 a(k-1) + v_3 y(k)$$

where v(k) is the estimated velocity for the current loop, v(k−1) is the estimated velocity for the previous loop, a(k−1) is the acceleration estimate for the previous loop, and $v_1$, $v_2$ and $v_3$ are normalized constants that are functions of the parameters $K_v$, $K_a$ and $T_s$ and the maximum expected velocity and acceleration estimates.

The acceleration estimate is implemented as:

$$a(k) = a_1 a(k-1) + a_2 [y(k) - v(k-1)]$$

where a(k) is the acceleration estimate for the current time loop and $a_1$ and $a_2$ are normalized constants that are functions of the parameters $K_v$, $K_a$ and $T_s$ and the maximum expected velocity and acceleration estimates. Example values for the normalized constants are $v_1=0.85$, $v_2=0.017$, $v_3=0.15$, $a_1=0.10625$ and $a_2=0.9375$. The above estimations are performed separately for each corner of the vehicle to obtain $a_{b1}(k)$, the estimated body corner acceleration for the front left corner of the vehicle, $a_{b2}(k)$, the estimated body corner acceleration for the rear left corner of the vehicle, $a_{b3}(k)$, the estimated body corner acceleration for the front right corner of the vehicle, and $a_{b4}(k)$, the estimated body corner acceleration for the rear right corner of the vehicle.

The resultant body corner acceleration estimates $a_{b1-4}(k)$ are provided on lines 153, 155, 157 and 159.

Summation blocks 112, 114, 116 and 118 sum each of the body corner absolute vertical velocity signals on lines 144, 146, 148 and 150 with the respective corner relative velocity signals from lines 76, 78, 80 and 82. The results of the summation blocks 112, 114, 116 and 118 are the signals on lines 120, 122, 124 and 126 representing the absolute wheel vertical velocity signals. More particularly, summation block 112 performs the function:

$$v_{wlf} = v_{blf} - rv_1$$

$$v_{wlr} = v_{blr} - rv_2$$

$$v_{wrf} = v_{brf} - rv_3$$

$$v_{wrr} = v_{brr} - rv_4$$

where $v_{wlf}$ is the left front wheel absolute vertical velocity signal, $v_{wlr}$ is the left rear wheel absolute vertical velocity signal, $v_{wrf}$ is the right front wheel absolute vertical velocity signal and $v_{wrr}$ is the right rear wheel absolute vertical velocity signal.

The wheel absolute vertical velocity signals on lines 120, 122, 124 and 126 are provided to the wheel estimation filters 128, 130, 132 and 134, which implement a velocity to acceleration Kalman filter transfer function similar to the transfer function implemented by the body estimation filters 152, 154, 156 and 158 with the filtered gains chosen to optimize isolation of signal components in the 8–15 Hz frequency range. Like the body estimation filters, the wheel estimation filters are implemented by two related equations to estimate $v(k)$ and $a(k)$ in the manner described above with reference to the body estimation filters. The wheel acceleration Kalman filter is implemented separately for each wheel of the vehicle to determine $a_{w1}(k)$, the estimated wheel vertical acceleration for the front left wheel, $a_{w2}(k)$, the estimated wheel vertical acceleration for the rear left wheel, $a_{w3}(k)$, the estimated wheel vertical acceleration for the front right wheel, and $a_{w4}(k)$, the estimated wheel vertical acceleration for the rear right corner of the vehicle. Example filter normalization constants for the front wheel estimation filters are $v_1=0.85$, $v_2=0.085$, $v_3=0.15$, $a_1=0.425$ and $a_2=0.75$ for the wheel estimation filters.

Figure 3:
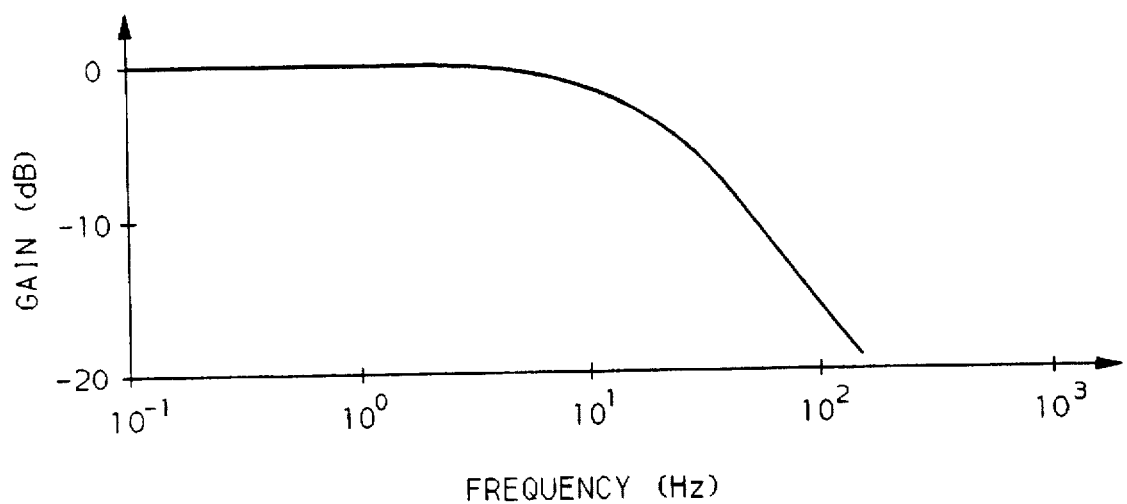
FIGS. 3–6 illustrate example gain and phase plots of filters for use with this invention.
Figure 4:
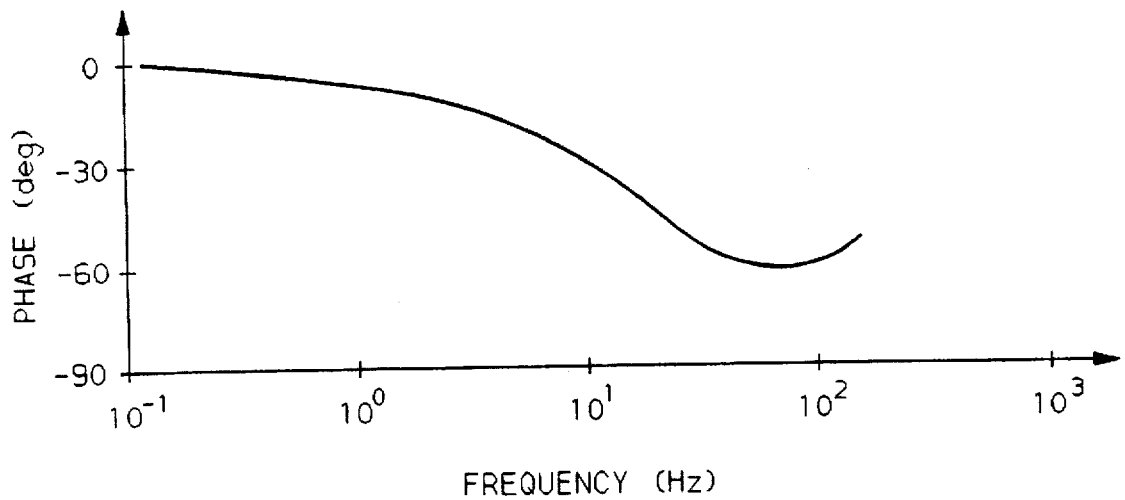
Figure 5:
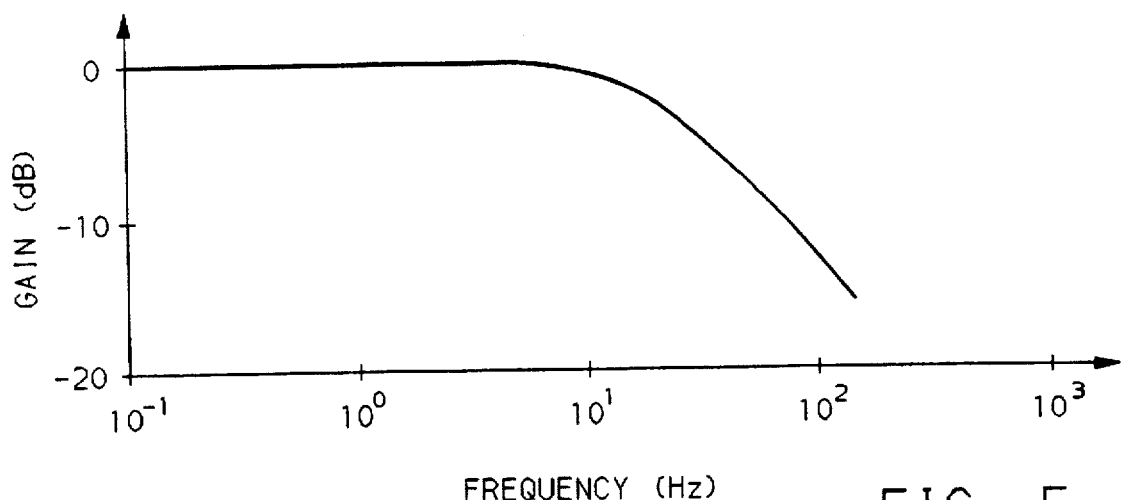
Figure 6:
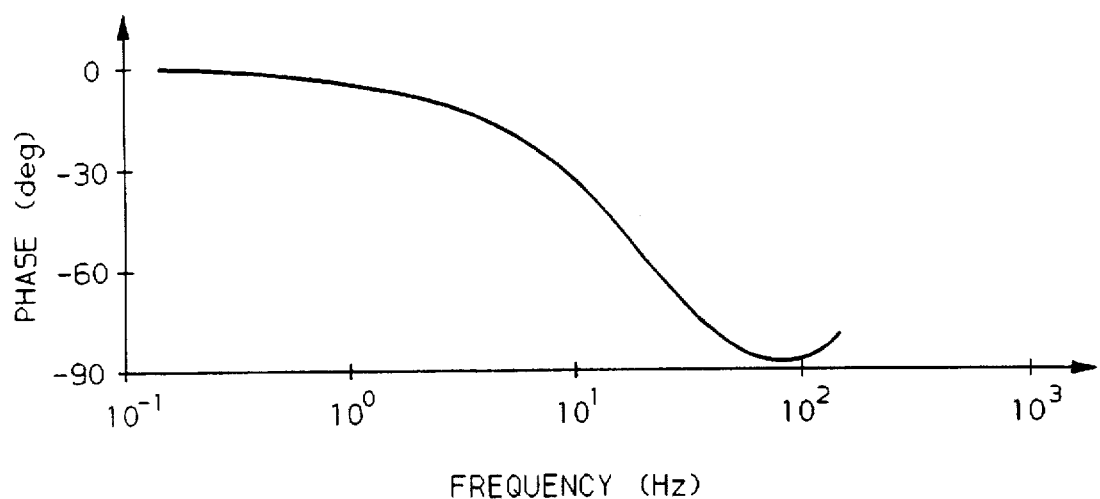

The outputs of the body estimation filters 152, 154, 156 and 158 and of the wheel estimated filters 128, 130, 132 and 134 are low pass filtered through one pole low pass filters 370, 372, 374, 376 and 136, 138, 140 and 142 to smooth the body and wheel acceleration estimates. Example gain and phase plots for the low pass filters 370, 372, 374, 376, are illustrated in FIGS. 3 and 4. Example gain and phase plots for the low pass filters 136, 138, 140 and 142 are shown in FIGS. 5 and 6.

The resultant filtered body and wheel vertical acceleration estimates are then provided to blocks 160, 162, 164 and 166 to estimate the dynamic normal force between the vehicle wheel and the road surface for each corner of the body. The dynamic normal force equation is given as:

$$\Delta F_n = m_{bn} a_{bn}(-k) + m_{wn} a_{wn}(k)$$

where $\Delta F_n$ is the dynamic normal force estimated for corner n (n=1, 2, 3, 4), $m_{bn}$ is the average mass of the vehicle body supported by the wheel at that corner of the vehicle and $m_{wn}$ is the mass of the vehicle wheel. Example body and wheel masses are $m_b=560$ kg and $m_w=60$ kg. The resultant dynamic normal force estimates on lines 168, 170, 172 and 174 are provided to the microcomputer output interface 176 and transferred on bus 56 to the ABS controller 28.

Figure 7:
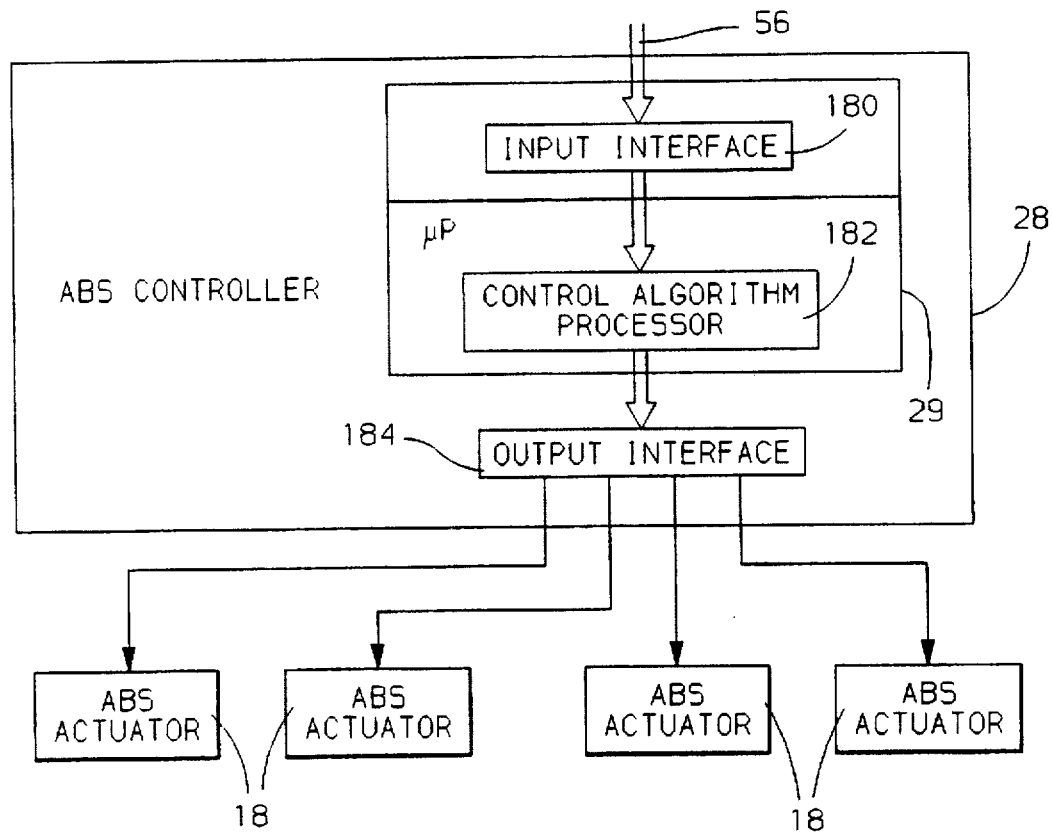
FIG. 7 illustrates an example schematic of a chassis system control according to this invention.

Referring to FIG. 7, the ABS controller 28 receives the dynamic normal force estimates via data bus 56 and input port 180 of microprocessor 29. Microprocessor 29 stores the received values in memory and uses a software control algorithm processor 182 to develop control commands for the ABS actuators 18 responsive to the computer dynamic normal force determined according to this invention.

The details of the control algorithm processor 182 may include those set forth in the above-mentioned pending application U.S. Ser. No. 08/235,733, filed Apr. 29, 1994. In general, control algorithm processor 182 performs ABS control algorithms of a type known to those skilled in the art with the modification that the anti-lock braking activation and deactivation criteria of wheel acceleration and wheel slip are adjusted in the presence of the significant change in tire normal force to time the activation and deactivation of the anti-lock braking control. More precisely, the anti-lock braking activation and deactivation criteria are adjusted to detect incipient wheel lock-up conditions as opposed to uneven driving surface conditions. Further, once anti-lock braking control is activated, the relationship between the wheel parameters of the wheel acceleration and the wheel slip and the brake pressure command may be adjusted as a function of change in tire normal force to provide for anti-lock braking control responsive primarily to change in road surface friction coefficient. The adjusted criteria are provided in the form of a plurality of schedules or look-up tables of reference values, one or more of which may become active in the anti-lock brake system control in response to the estimated change in tire normal force. Since implementation of dynamic formal force estimations and the control algorithm processor 182 is fully explained in the pending application, Ser. No. 08/235,733, further details of such implementations need not be set forth herein.

The actuator commands determined by the control algorithm processor 182 are output by output interface 184 of a known type to control the ABS actuators 18 to achieve the desired anti-lock braking performance.

Figure 8:
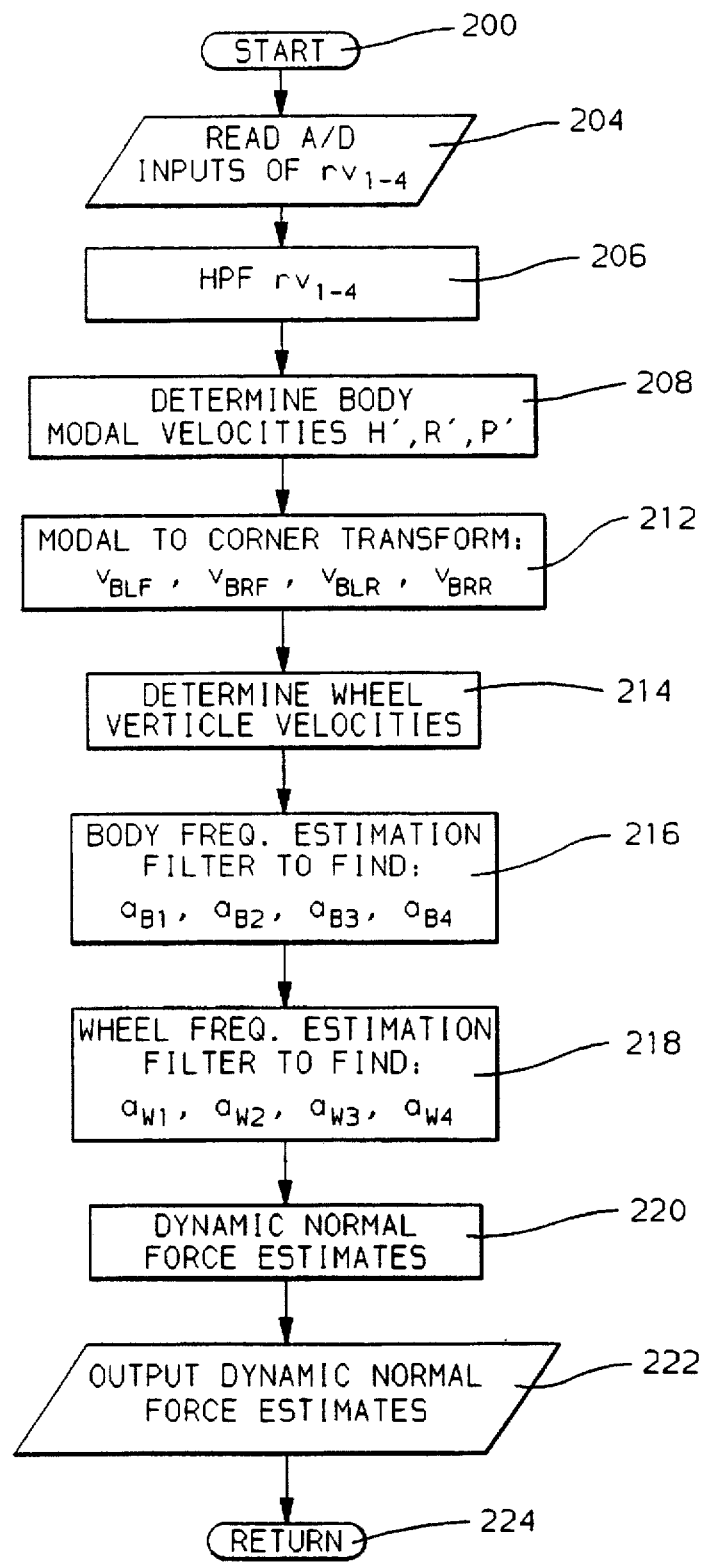
FIG. 8 illustrates an example computer flow diagram for estimating dynamic normal forces according to this invention.

Referring now to FIG. 8, a flow diagram for the implementation of dynamic normal force estimation according to this invention into the suspension controller microprocessor control algorithm starts at block 200 and moves to block 204 where it reads its internal A/D converter the relative velocity signals derived from the outputs of position sensor 15, as explained above, with reference to FIG. 2. At block 206 the relative velocity signals are high pass filtered to remove any DC bias introduced by the conversion and at block 208 the body modal velocities H', R' and P' are determined as described above with reference to block 102 in FIG. 2.

At block 212, the modal to corner transform for converting the body absolute heave, roll and pitch velocities, H', R' and P' into corner absolute vertical velocities is implemented as described above with reference to block 110 in FIG. 2. At block 214, the wheel vertical velocities are determined as described with reference to blocks 112, 114, 116 and 118 of FIG. 2. At block 216, the body corner vertical velocities are each provided to the discrete implementation of the body frequency estimation filter described above with reference to FIG. 2, blocks 152, 154, 156 and 158, to determine the body corner absolute acceleration. At block 218, each of the wheel absolute vertical velocities is input to a discrete implementation of the wheel frequency estimation filter described above with reference to blocks 128, 130, 132 and 134 of FIG. 2 to determine the absolute vertical accelerations of each of the vehicle wheels.

At block 220, the dynamic normal force estimations for each wheel of the vehicle is determined as described above with reference to blocks 160, 162, 164 and 166 (FIG. 2). At block 222, the dynamic normal force estimates are output to the ABS controller and at block 224, the dynamic normal force determination routine is ended.

Figure 9:
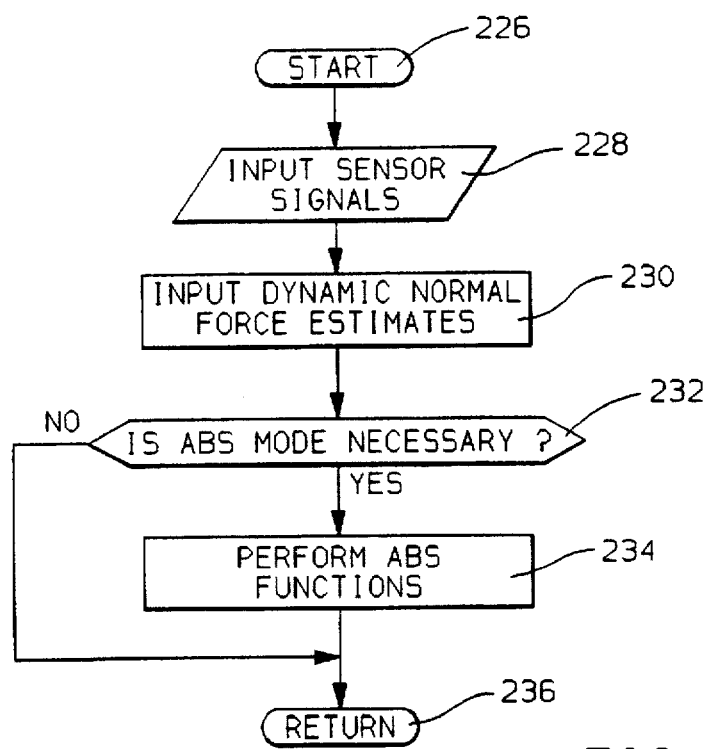
FIG. 9 illustrates an example computer flow diagram for implementing dynamic normal force estimates into a chassis controller according to this invention.

Referring to FIG. 9, in the ABS controller, the control algorithm processor starts at block 226, inputs the signals used to determine anti-lock braking conditions and appropriate commands when the antilock braking conditions exist. Block 230 inputs the dynamic normal force estimates provided by the suspension controller.

At block 232, the routine determines if it is desirable for the vehicle to enter into ABS mode responsive to the input sensor signals and the dynamic normal force estimate in the manner described above and in pending application Ser. No. 08/235,733. If ABS mode is not desired, the substantive operating portion of the ABS routine ends at block 236. If ABS mode is desirable, from block 232, the routine moves to block 234 where it performs the ABS control functions to develop an output control command for the ABS actuators to minimize wheel slip responsive to the input sensor signals and the estimated normal force. The control functions of block 234 may be implemented in the manner described above and in the pending application U.S. Ser. No. 08/235,733.

EXAMPLE 2

Figure 10:
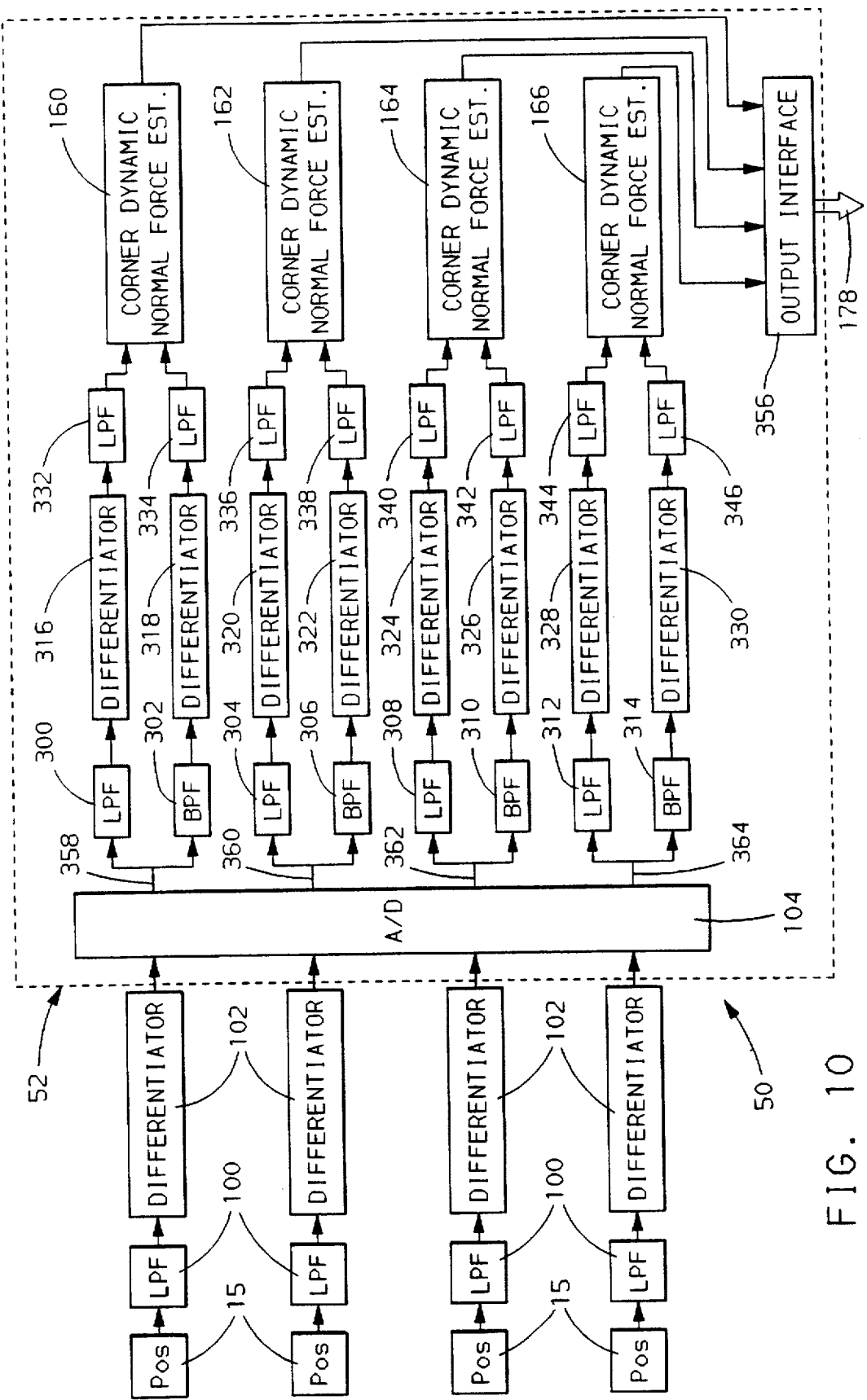
FIG. 10 illustrates a second example control structure for estimating corner dynamic normal forces according to this invention.

Referring now to FIG. 10, a second example implementation of this invention is shown for estimating normal dynamic forces. Blocks 15, 100, 102 and 104 illustrate receipt of the four relative position sensor signals from the relative position sensors, low pass filtering and differentiating the signals to develop relative velocity signals and providing those signals to the multiplexed A/D input of the microprocessor 152. At the output of the A/D converter 104, a high pass filter routine (not shown) is implemented to remove DC bias in the relative velocity signals introduced by the A/D conversion.

The resultant signals on lines 358, 360, 362 and 364, representing the four body corner to wheel relative velocities $rv_1$, $rv_2$, $rv_3$ and $rv_4$, are each provided to separate low pass and band pass filters as shown with reference to blocks 300–314. The low pass filters are designed to isolate body components of the relative velocity signals, for example, to pass frequency signals below 2 Hz. The resulting outputs from the low pass filter routine are signals representative of the body corner absolute vertical velocities. The band pass filters are designed to isolate components from the relative velocity signals in the frequency range of 8–15 Hz and provide output signals indicative of the absolute vertical velocities of the vehicle wheel.

The outputs from the low pass filters 300, 304, 308 and 312 are provided to the body estimation Kalman filters 152, 154, 156 and 158, described above with reference to FIG. 2, to determine estimates of the absolute vertical accelerations of the four corners of the vehicle body. The outputs of the band pass filters 302, 306, 310 and 314 are provided to the wheel estimation Kalman filter blocks 128, 130, 132 and 134 of FIG. 2, to provide output estimations of the wheel absolute vertical accelerations. The acceleration estimates output from blocks 316–330 are provided to low pass filters 332–346 to smooth the acceleration estimates. The filtered acceleration estimates are then provided to the corner dynamic normal force estimation blocks 160, 162, 164 and 166, which are the same as those described above with reference to FIG. 2.

Figure 11:
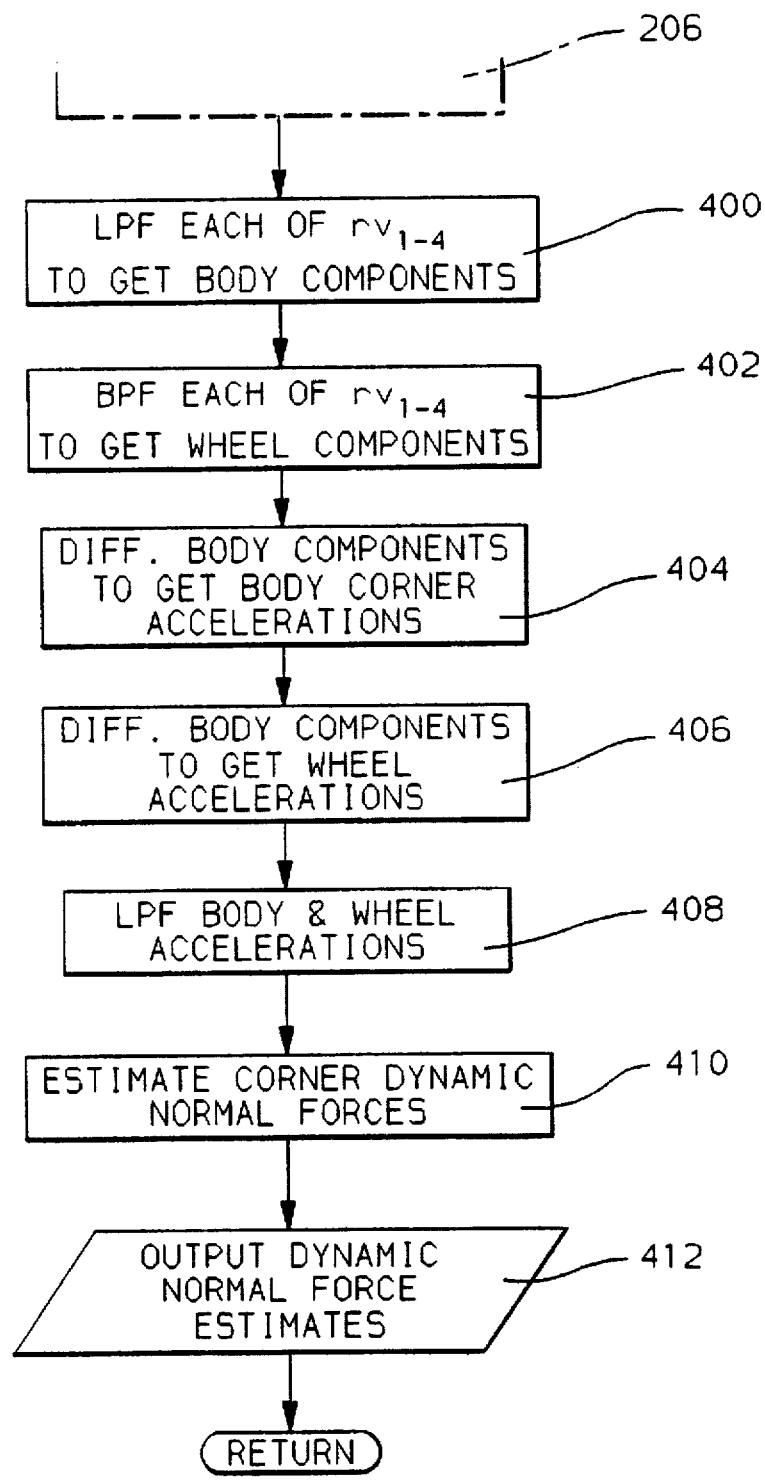
FIG. 11 illustrates another example computer flow diagram for estimating dynamic normal forces.

The flow chart in FIG. 11 illustrates modification to the suspension system control flow routine to implement the example of this invention shown in FIG. 10. From block 206 (FIG. 8) the routine moves to block 400 where each of the relative velocity signals is low pass filtered to obtain the body components of the relative velocity signal. An example discrete implementation of the low pass filter suitable for use at block 400 includes two cascaded first order low pass filters as follows:

$$H_1(n)=H_a rv_i(n)+H_b H_1(n-1),$$

$$H_2(n)=H_a H_1(n)+H_b H_2(n-1),$$

where $H_1(n)$ is the output of the first low pass filter, $rv_i(n)$ (i=1, 2, 3, 4) is the relative velocity signal input to the filter, $H_a$ and $H_b$ are constants for the two filters, and $H_2(n)$ is the output of the second low pass filter. Example values for the filter constant are $H_a=0.010926$ and $H_b=0.997009$.

At block 402, each of the relative velocity signals is band pass filtered to isolate the wheel components from the relative velocity signals. A band pass filter suitable for implementation in block 402 is a second order band pass filter implemented discretely as:

$$H(n)=H_a x(n)-H_a x(n-1)+H_{b1}H(n-1)+H_{b0}H(n-2),$$

where $x(n)$ is the filter input, $H_a$, $H_{b1}$ and $H_{b2}$ are filter constants, example values of which may be 0.101059, 1.893455 and −0.898844, respectively.

At blocks 404 and 406, the body and wheel acceleration estimates are determined as described above with reference to FIG. 2. At blocks 408, 410 and 412, the body and wheel acceleration estimates are low pass filtered, used as inputs to estimate the dynamic normal forces between each wheel of the vehicle and the road surface and output to the ABS controller as described above.

EXAMPLE 3

According to another example implementation of this invention, instead of the dynamic normal force estimates being transferred to the ABS controller as above, the suspension controller further processes the dynamic normal force estimates as follows. When a dynamic normal force estimate peaks above a predetermined threshold, the suspension controller detects this peak and keeps track of the frequency of the dynamic force estimation peaks over the threshold. The frequency of the estimation peaks controls an ABS table pointer. Frequencies in a first range set the pointer to 00 (smooth road), frequencies in a second range set the pointer to 01 (mild bumps on road), frequencies in a third range set the pointer to 10 (moderately heavy bumps on road) and frequencies in a fourth range set the pointer to 11 (heavy bumps on road).

The pointer signal is output to the ABS controller, which reads the signal and uses the pointer signal to schedule sets of ABS tables controlling entry and exit into ABS for smooth, mildly bumpy, moderately heavy bumpy and heavy bumpy roads. Further, the release and apply rates can be scheduled in response to the pointer.

It will be understood by those skilled in the art that the above examples describe this invention as embodying a vehicle chassis system control according to the steps of: determining relative velocity between a corner of a vehicle body and a vehicle wheel responsive to a signal from a relative position sensor mounted between the vehicle body corner and the vehicle wheel; estimating, responsive to the relative velocity signal, a body acceleration signal indicative of a vertical acceleration of the corner of the vehicle body; estimating, responsive to the relative velocity signal, a wheel acceleration signal indicative of a vertical acceleration of the vehicle wheel; estimating a dynamic normal force between the wheel and a road surface responsive to the estimated body and wheel accelerations; and providing the estimated normal dynamic force to a chassis system controller, wherein a chassis system actuator is controlled by a control command determined responsive to the estimated dynamic normal force.

EXAMPLE 4

Figure 12:
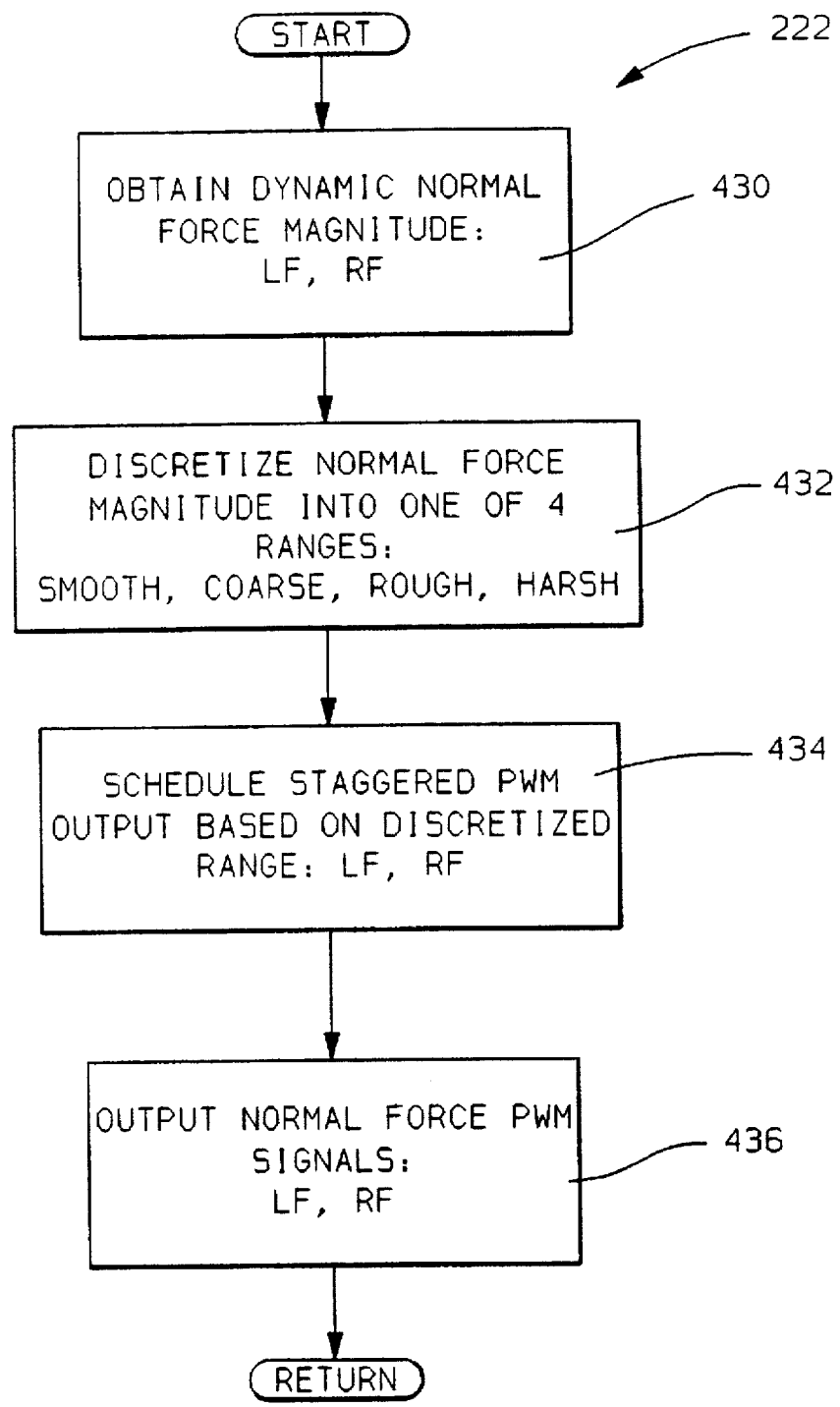
FIG. 12 illustrates an example computer flow diagram for outputting dynamic normal force estimates to a brake controller.
Figure 13:
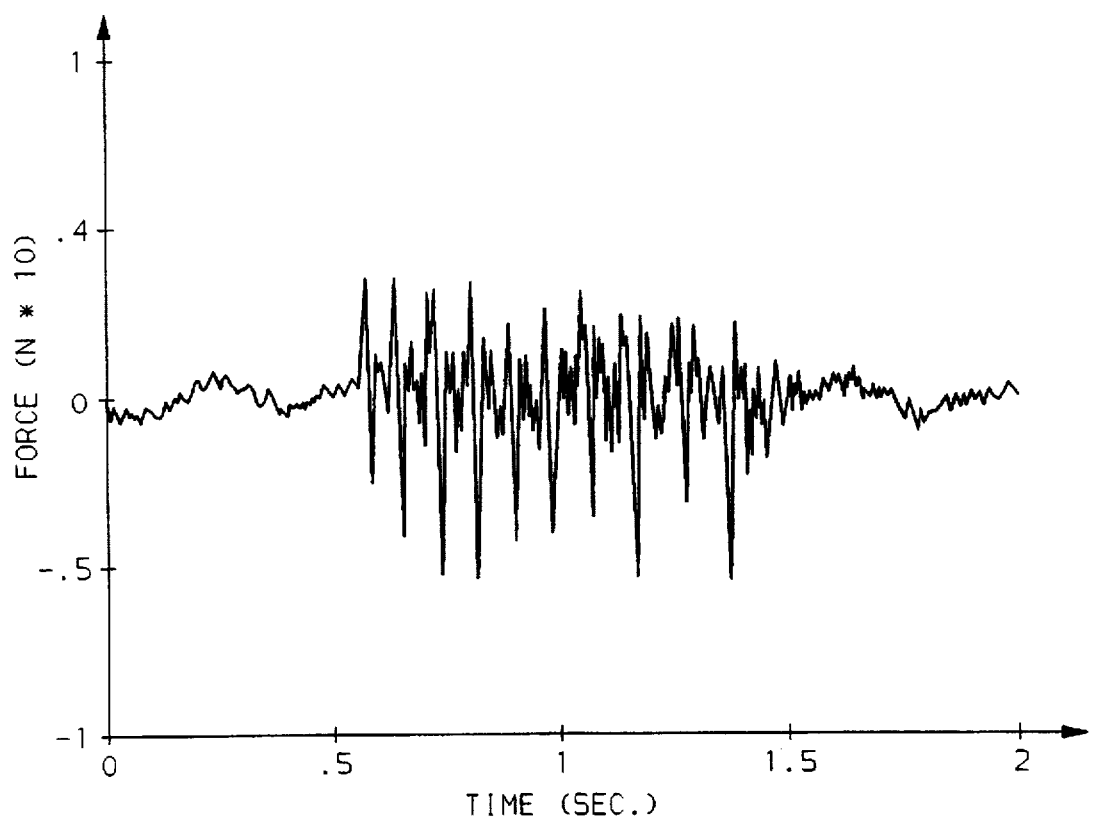
FIGS. 13–16 illustrate performance data in an example chassis control system implementing body accelerometers.
Figure 14:
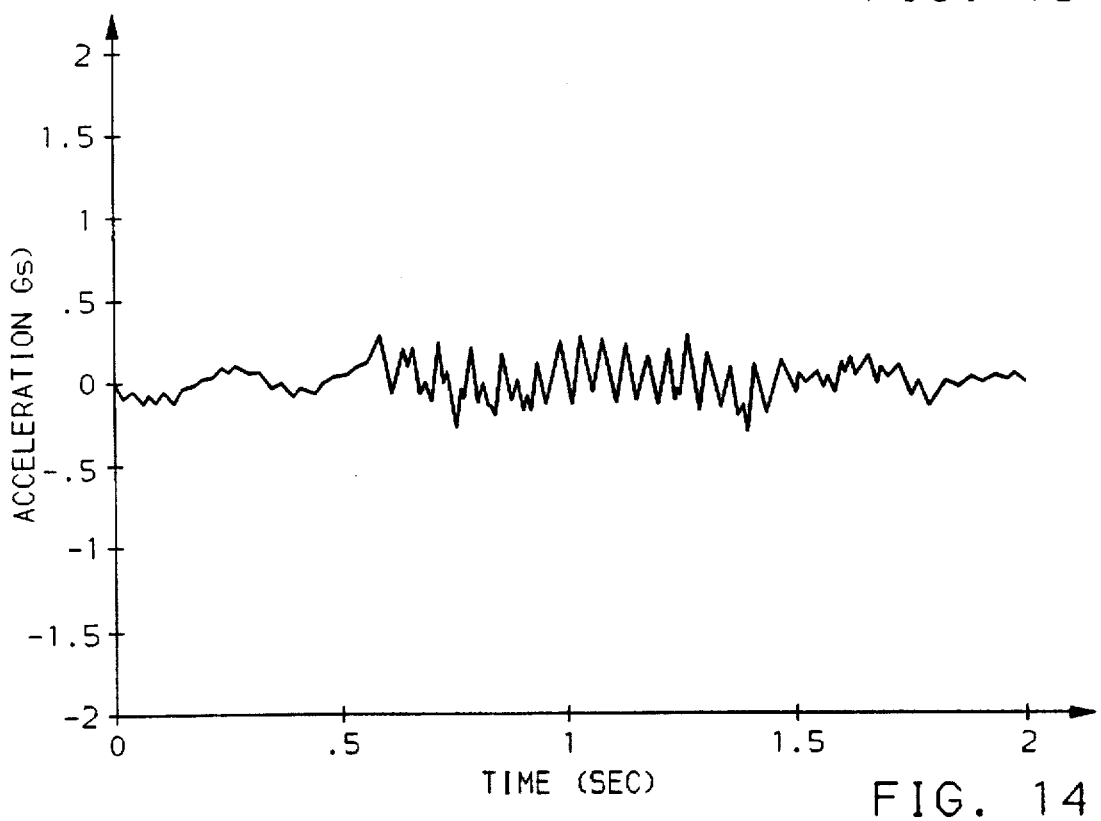
Figure 15:
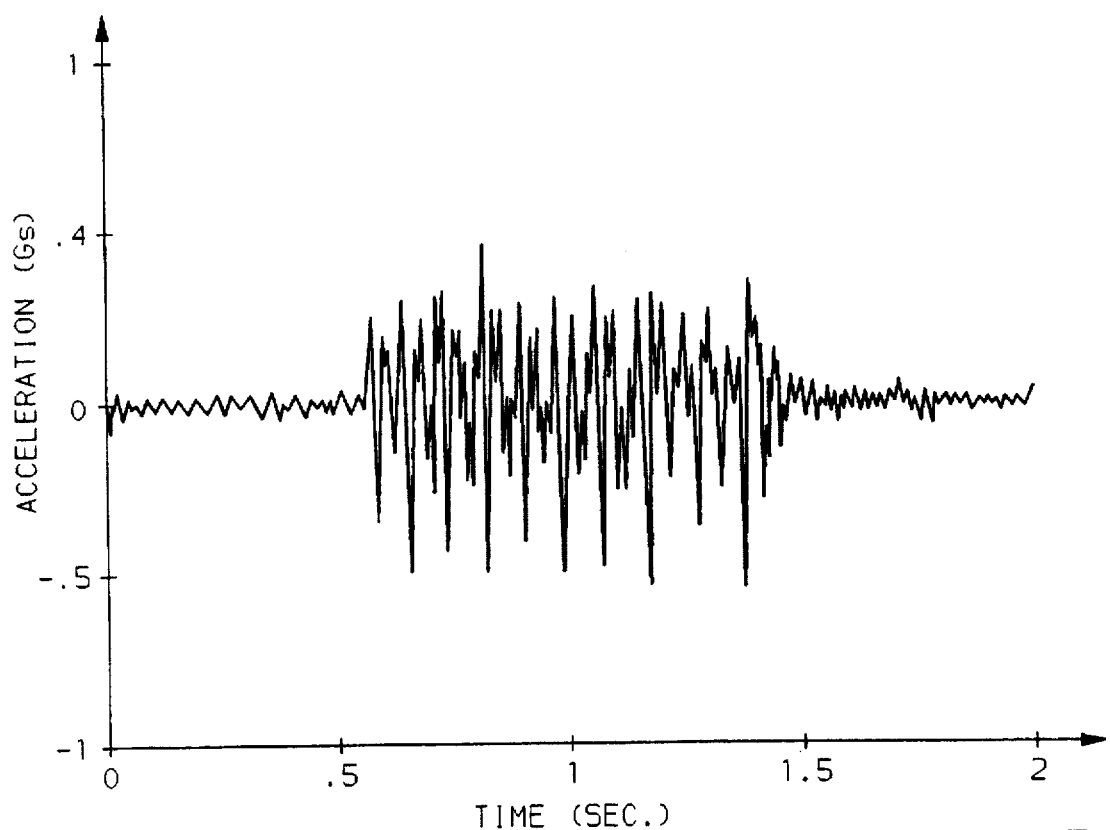
Figure 16:
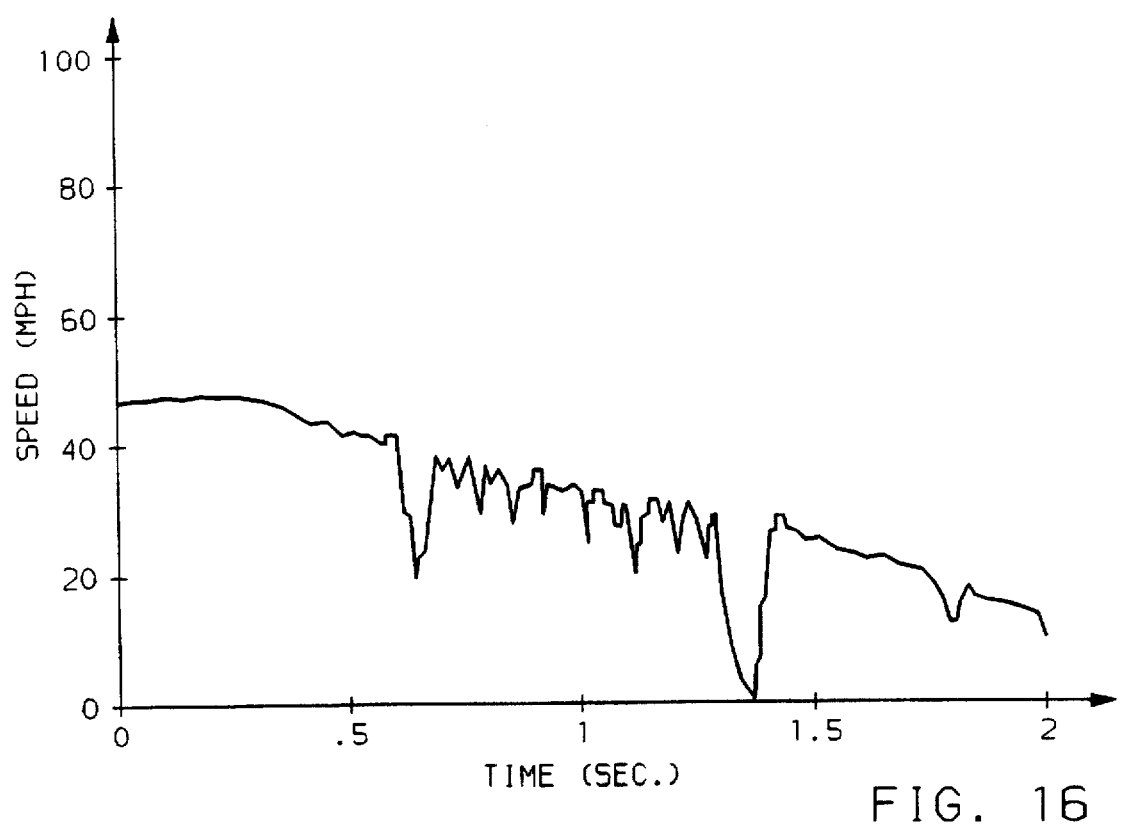
Figure 17:
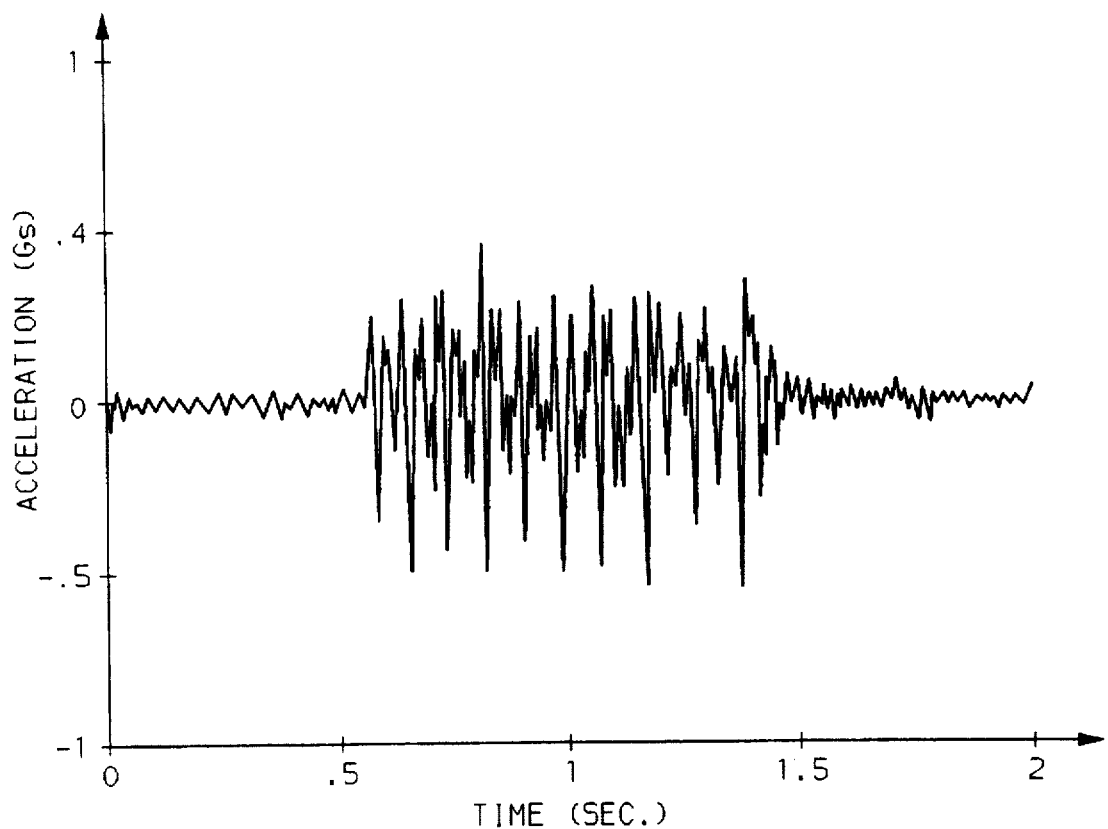
Figure 18:
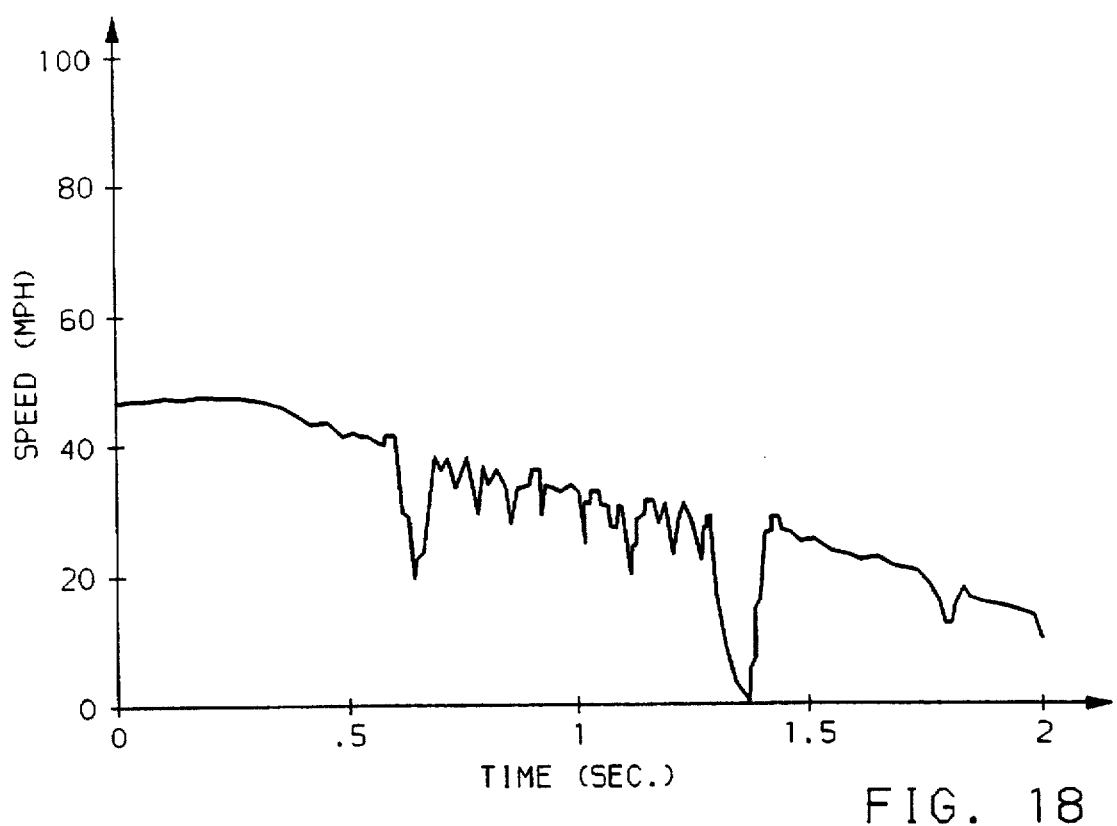
Figure 19:
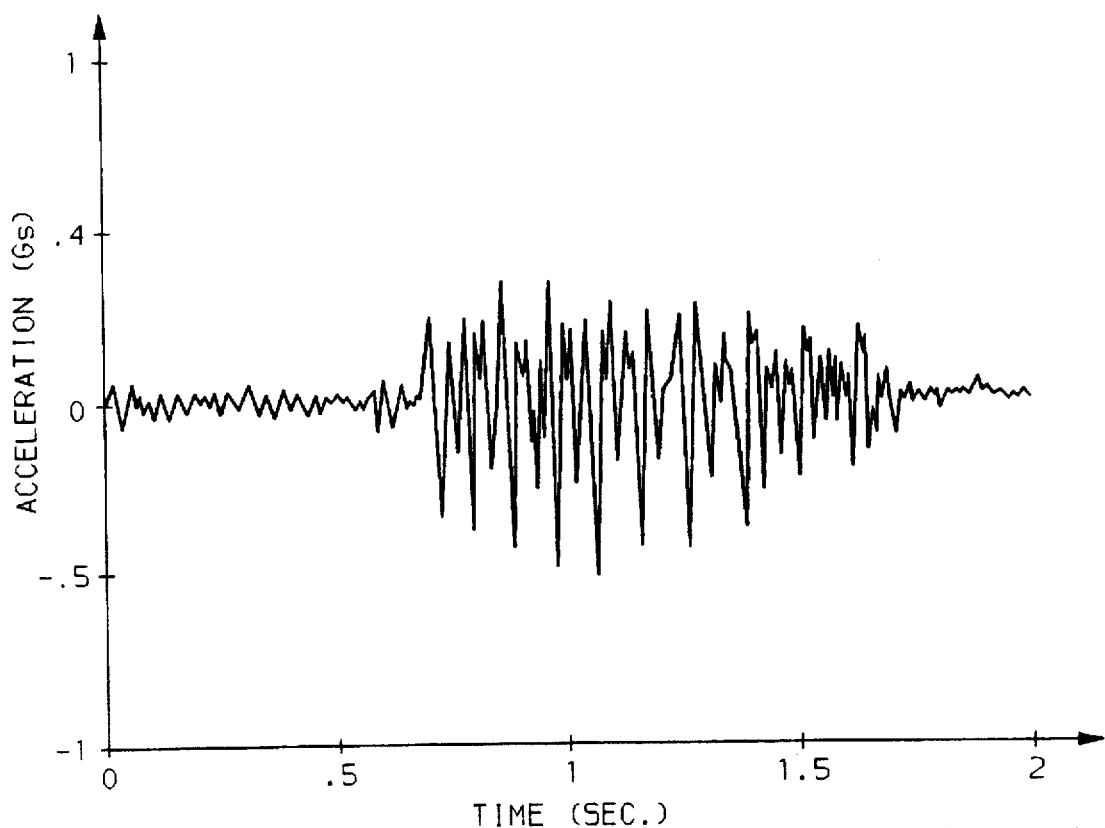
Figure 20:
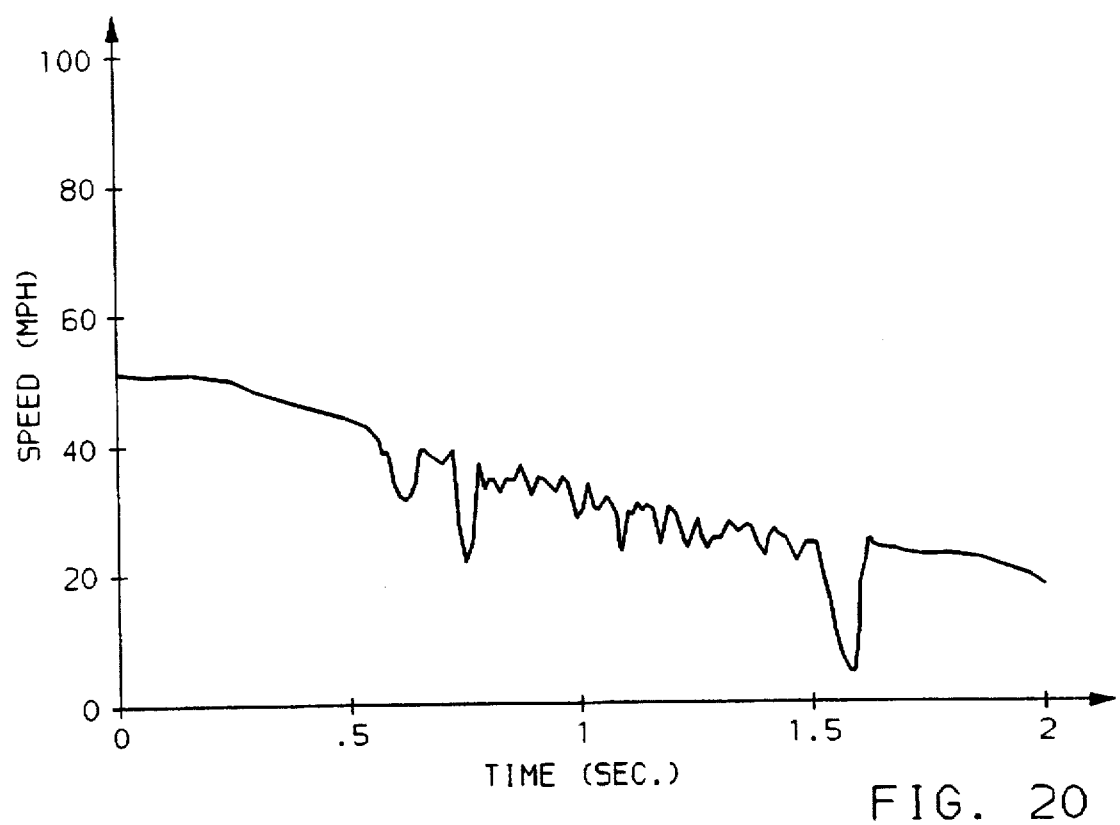

Referring now to FIG. 12, the flow diagram illustrates an example implementation of how block 222, in FIG. 8, processes and outputs the dynamic normal force estimates. More particularly, block 430 reads the magnitudes of the left and right front dynamic normal force estimates from memory in the suspension controller 50. Block 432 places each dynamic normal force estimate magnitude into one of four road surface categories in order from smoothest to most harsh, lower dynamic normal force estimates corresponding to smooth roads and higher dynamic normal force estimates corresponding to rough roads. Block 434 then determines PWM output commands having duty cycles corresponding to the categories determined at block 432. For example, an 80 percent duty cycle corresponding to the smooth road category, a 60 percent duty cycle corresponding to the second smoothest category, a 40 percent duty cycle corresponding to the second roughest category, and a 20 percent duty cycle corresponding to the roughest category.

Block 436 then outputs the dynamic normal force estimate PWM commands on a serial data line where they are read by the vehicle brake controller. In one example implementation, with each control loop of the program, one dynamic normal force estimate is transmitted to the brake controller twice, to allow error checking of the received data. In successive control loops, the dynamic normal force output is alternated between the PWM commands corresponding to the left front and right front dynamic normal force estimates.

In the brake controller, the brake controller verifies that communication of the normal force estimate is normal and then filters the normal force estimate for each wheel. For each wheel, if ABS is inactive, a normal force index is set equal to a first low pass filter output of the normal force signals for that wheel. As the normal force index increases, the wheel slip threshold, or other entry criteria for entering ABS is increased, thus calibrating ABS entry responsive to normal force estimates for each wheel. If ABS is active for a particular wheel, the normal force index is set equal to a second low pass filter output of the normal force signals for that wheel, where the second low pass filter has a lower break frequency than the first low pass filter. The normal force estimate is then used to calibrate ABS pressure releases and pressure applies, so that as normal force increases, there is less pressure released during a release and the pressure applies are more aggressive, i.e., the controller does not assume a low friction coefficient surface but rather assumes a high friction coefficient surface. One skilled in the art can use the normal force estimate to calibrate the appropriate control variables in a particular brake system to achieve the control described herein.

EXAMPLE 5

As mentioned above, the improvements of pending application, Ser. No. 08/441,369 may be used with this invention to allow control of one or more vehicle chassis systems while eliminating both body accelerometers and relative position sensors. As described in the pending application Ser. No. 08/441,369, wheel speed sensor information can be used to provide signals indicative of body to wheel relative velocity and body corner velocity for each corner of the vehicle. According to this invention, the resultant relative velocity and body corner velocity signals are used as described above to compute dynamic normal force.

One skilled in the art will understand that this invention, when used in a vehicle without relative position sensors, is embodied in the method comprising including determining relative velocity between a corner of a vehicle body and a vehicle wheel responsive to a sensor signal from a wheel rotational velocity sensor mounted to the wheel. Responsive to the sensor signal, a body acceleration signal indicative of a vertical acceleration of the corner of the vehicle body is estimated. Responsive to the sensor signal, a wheel acceleration signal indicative of a vertical acceleration of the vehicle wheel is estimated. The dynamic normal force between the wheel and a road surface is then estimated responsive to the estimated body and wheel accelerations; and providing the estimated normal dynamic force to a chassis system controller, wherein a chassis system actuator is controlled by a control command determined responsive to the estimated dynamic normal force.

As is illustrated by the above illustrative examples, the vehicle chassis system control according to this invention can be implemented in a variety of chassis systems and the specific system hardware used may be any of those described above or other known hardware for providing vehicle chassis control.

Referring to FIGS. 13-21, example performance data showing estimated accelerations and dynamic normal force in an example system with an accelerometer is compared to an example system without an accelerometer according to this invention.

FIGS. 13 and 14, 15 and 16 illustrate, for an example front right wheel of a vehicle, data including estimated dynamic normal force, estimated body and wheel vertical accelerations and measured wheel speed during a vehicle maneuver that involves braking over a series of bumps. The data illustrated in FIGS. 13-16 was measured and calculated in a system using body accelerometers as described in pending application, Ser. No. 08/235,733.

FIGS. 17-20 show data for the same wheel of the same vehicle which repeats the braking maneuver over the same series of bumps. However, the data in FIGS. 17-20 is computed according to this invention as described above with reference to FIG. 2, which eliminates the body accelerometers.

Figure 21:
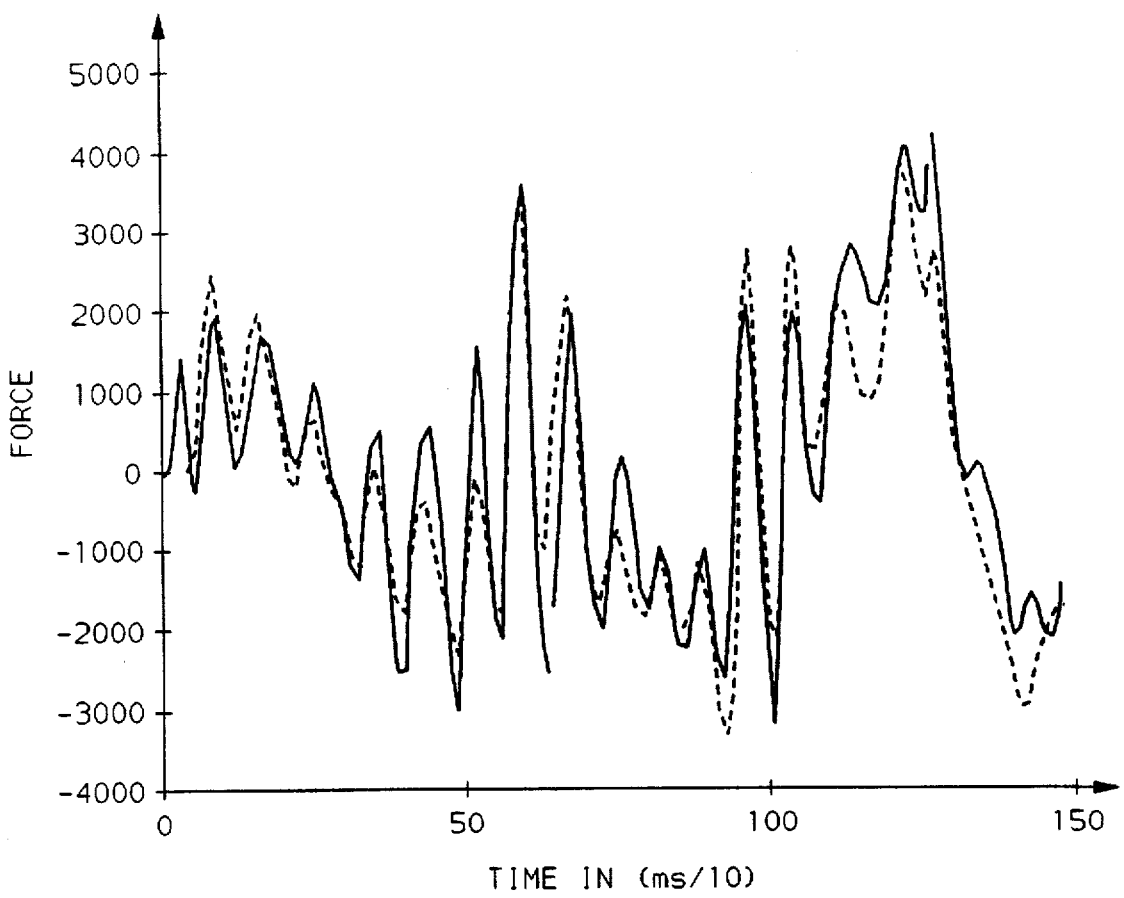
FIGS. 17–21 illustrate performance data from an example chassis control system according to this invention.

Referring to FIG. 21, dynamic normal force estimations are plotted for a front right vehicle wheel that has been driven in a straight line over a rail road track during a brake apply. The solid line is the dynamic normal force estimation using a body accelerometer and the dashed line is the dynamic normal force estimation according to this invention determined without use of a body accelerometer.

As can be seen, this invention without body accelerometers, as compared to systems implementing body accelerometers, provides similar performance results in the dynamic normal force estimates and body and wheel acceleration estimates. The FIGS. 13-21 illustrate that an advantage provided from this invention is a control for a chassis system that does not include body accelerometers, while providing dynamic normal force estimation-based control comparable to a system that relies on body accelerometers.

In the above-described examples, dynamic normal force estimates are used to control one chassis system via an ABS controller. Additionally, it may be desirable to control other vehicle chassis systems responsive to the computer dynamic normal force. For example, in a controllable variable force damping system, gain schedules for the damping commands may be adjusted responsive to the estimated dynamic normal forces to improve wheel control and/or body comfort.

We claim:

1. A vehicle chassis system control comprising the steps of: determining relative velocity between a corner of a vehicle body and a vehicle wheel responsive to a sensor signal from one of: (i) a relative position sensor mounted between the vehicle body corner and the vehicle wheel and (ii) a wheel rotational velocity sensor mounted to the vehicle wheel; estimating, responsive to the relative velocity, a body acceleration signal indicative of a vertical acceleration of the corner of the vehicle body; estimating, responsive to the relative velocity, a wheel acceleration signal indicative of a vertical acceleration of the vehicle wheel; estimating a dynamic normal force between the wheel and a road surface responsive to the estimated body and wheel accelerations; and providing the estimated dynamic normal force to a chassis system controller, wherein a chassis system actuator is controlled by a control command determined responsive to the estimated dynamic normal force.

2. A vehicle chassis system control method according to claim 1, also comprising the step of estimating a body velocity signal indicative of a vertical velocity of the corner of the vehicle body (110).

3. A vehicle chassis system control method according to claim 2, wherein the step of estimating the body velocity signal includes transforming signals representative of body heave, roll and pitch velocities (102) to the body velocity signal through a modal-to-corner transform processor (110).

4. A vehicle chassis system control according to claim 2 also comprising the step of estimating a wheel vertical velocity signal indicative of a vertical velocity of the vehicle wheel (112).

5. A vehicle chassis system control according to claim 4, also comprising the step of determining a relative velocity signal indicative of a relative vertical velocity between the wheel and the corner of the vehicle body responsive to the sensor signal (100), wherein the wheel vertical velocity signal is determined responsive to a sum of the body velocity signal and the relative velocity signal (112).

6. A vehicle chassis system control according to claim 4, also comprising the step of determining a relative velocity signal indicative of a relative vertical velocity between the wheel and the corner of the vehicle body responsive to the sensor signal (102), wherein the step of estimating the wheel vertical velocity signal includes band pass filtering the relative velocity signal (302, 306, 310, 314).

7. A vehicle chassis system control according to claim 6, wherein the band pass filter isolates relative velocity signal frequency components in an 8–15 Hz range.

8. A vehicle chassis system control according to claim 2 wherein the body acceleration signal is estimated with a discretely implemented fixed constant Kalman filter (152–158).

9. A vehicle chassis system control according to claim 8 wherein the discretely implemented Kalman filter comprises:

$$v(k)=v_1 v(k-1)+v_2 a(k-1)+v_3 x(k)$$

where $v(k)$ is the estimated body velocity signal for a present time loop, $v(k-1)$ is the estimated velocity signal for a previous loop, $a(k-1)$ is the estimated body acceleration signal for the previous loop, and $v_1$, $v_2$ and $v_3$ are normalized constants, and $$a(k)=a_1 a(k-1)+a_2[y(k)-v(k-1)]$$

where $a(k)$ is the estimated body acceleration signal for the present time loop and $a_1$ and $a_2$ are normalized constants.

10. A vehicle and chassis system control according to claim 2, also comprising a step of determining a relative velocity signal indicative of a relative vertical velocity between the wheel and the corner of the vehicle body responsive to the sensor signal (102), wherein the step of estimating the body velocity signal includes low pass filtering the relative velocity signal (300, 304, 308, 312).

11. A vehicle chassis system control according to claim 10, wherein the low pass filter isolates relative velocity signal components in a frequency range of 0–2 Hz.

12. A vehicle chassis system control apparatus comprising:

a sensor providing a sensor signal indicative of suspension relative velocity;

a chassis system actuator controllable in response to a control command;

a microprocessor based controller receiving the sensor signal and, responsive thereto, developing the control command, wherein the microprocessor based controller includes, (a) a body frequency estimation filter, responsive to the sensor signal indicative of suspension relative velocity, providing an estimated body corner absolute vertical acceleration signal output;

(b) a wheel frequency estimation filter, responsive to the sensor signal, providing an estimated wheel absolute vertical acceleration signal output; and (c) a dynamic normal force estimator responsive to the estimated wheel and body corner absolute vertical accelerations providing an estimated dynamic normal force signal output, wherein the control command is responsive to the estimated dynamic normal force signal.

13. A vehicle chassis control apparatus in accordance with claim 12, wherein the microprocessor based controller also comprises:

a differentiator for determining a body to wheel relative velocity signal responsive to the sensor signal;

a body modal velocity estimator for estimating body modal velocities responsive to the relative velocity signals;

a modal to corner signal transformer for determining a body corner absolute vertical velocity signal responsive to the estimated body modal velocities; and a summer for summing the corner absolute vertical velocity signal with the relative velocity signal to determine a wheel absolute velocity signal, wherein the body corner absolute vertical velocity signal is an input to the body frequency estimation filter and the wheel absolute vertical velocity signal is an input to the wheel frequency estimation filter.

14. A vehicle chassis control apparatus in accordance with claim 12, wherein the microprocessor controller also comprises:

a differentiator for determining a body to wheel relative velocity signal responsive to the sensor signal;

a low pass filter receiving the relative velocity signal, passing first frequency components of the relative velocity signal indicative of body corner absolute vertical velocity;

a band pass filter receiving the relative velocity signal and passing second frequency components of the relative velocity signal indicative of wheel absolute vertical velocity, wherein the first frequency components are provided to the body frequency estimation filter and the second frequency components are provided to the wheel frequency estimation filter.

15. A vehicle chassis system apparatus according to claim 12, wherein the actuator is a suspension system actuator.

16. A vehicle chassis system apparatus according to claim 12, wherein the actuator is an anti-lock brake actuator.

* * * * *